United States Patent [19]

Ennis

[11] Patent Number: 4,591,621

[45] Date of Patent: May 27, 1986

[54] CHLORINATED POLYETHYLENE ELASTOMERS

[75] Inventor: Royce E. Ennis, Beaumont, Tex.

[73] Assignee: E. I. Du Pont de Nemours and Company, Wilmington, Del.

[21] Appl. No.: 518,744

[22] Filed: Jul. 29, 1983

[51] Int. Cl.$^4$ ................................................ C08F 8/34
[52] U.S. Cl. ................................ 525/344; 525/333.7; 525/333.9; 525/356
[58] Field of Search .................. 525/333.7, 333.9, 344, 525/356

[56] References Cited

U.S. PATENT DOCUMENTS

| | | | |
|---|---|---|---|
| 2,586,363 | 2/1952 | McAlevy | 260/79.3 |
| 2,982,759 | 5/1961 | Heuse | 260/79.3 |
| 3,033,845 | 5/1962 | Scott | 260/94.9 |
| 3,296,222 | 1/1967 | Dixon et al. | 260/79.3 |
| 3,347,835 | 10/1967 | Lorenz | 525/333.9 |
| 3,759,888 | 9/1973 | Nose et al. | 525/356 |

Primary Examiner—Paul R. Michl
Assistant Examiner—Alex H. Walker

[57] ABSTRACT

An uncured chlorinated polyethylene elastomer having a molecular weight distribution of about 6–13, as determined by the ratio of $\overline{M}w/\overline{M}n$ where $\overline{M}w$ represents the weight average molecular weight and $\overline{M}n$ represents the number average molecular weight, a chlorine content of about 20–28% by weight, a Mooney viscosity value, determined according to ASTM D 1646-81, $ML_{(1+4)}$ at 100° C., of about 15–36; and, optionally, a sulfur content of about 0.2–2% by weight and a process for their preparation.

6 Claims, No Drawings

CHLORINATED POLYETHYLENE ELASTOMERS

BACKGROUND OF THE INVENTION

This invention relates to a novel chlorinated polyolefin elastomer having unique physical characteristics and to a process for making the same.

The chlorinated polyolefins, i.e., chlorinated polyethylene and chlorosulfonated polyethylene, have rubber-like properties due to the substitution of chlorine atoms into the polyethylene. These elastomers are resistant to deterioration due to ozone, they are resistant to solvents and they have a high resistance to the swelling action of oils. Chlorosulfonated polyethylene has sulfonyl chloride groups in the elastomer and these groups provide sites of reactivity through which crosslinking or curing, if desired, can be effected.

Chlorinated polyethylene and chlorosulfonated polyethylene elastomers have been used to coat fabrics to make tarpaulins, to make industrial pump diaphragms, to make conveyor belts, for wire and cable jacketing, and, more recently, they have been used as pond and pit liners, and roofing film. The uncured elastomers are sold as such and usually they are subsequently compounded with acid acceptors, pigments, fillers, and the like, and formed into products by, for example, calendering or extrusion processes. These chlorinated polyethylene elastomers can also be cured by conventional procedures. Prior to the present invention, when chlorinated polyethylene elastomers were formed, especially when the elastomer was calendered or extruded, it was very difficult to feed the uncured compounded elastomer into the equipment, for example, the nip of the counter-rotating calender rolls, so that the rollers or other feeding mechanism would readily pick up the uncured compounded elastomer to form a finished product. More importantly, when extruding the compounded chlorinated polyethylenes known prior to the present invention into sheets or films it was not possible to substantially draw down the sheets or films to reduce their thickness without rupturing them. The present invention provides a chlorinated polyethylene elastomer that can be substantially drawn down without rupturing or breaking to make a wider range of thickness of sheets or films.

Prior to the present invention in order to make an elastomer that processes more readily and shows an improvement in elongation, it was necessary to add to the elastomer rather large amounts of plasticizer and to use higher temperatures when calendering. The addition of plasticizers in amounts sufficient to improve elongation adversely affects the properties of the elastomer. In addition, if the temperatures used during the calendering operation are increased, for example, to about 150°–165° C. when processing chlorosulfonated polyethylene, in order to sufficiently lower the viscosity of the chlorinated polyethylene elastomer for ease of processing, the elastomer starts to decompose. Furthermore, such temperatures increase the potential for $SO_2$ evolution and scorching, i.e., premature vulcanization.

The present invention provides a novel uncured chlorinated polyethylene elastomer that has valuable characteristics of other chlorinated polyethylenes, but, in addition, the uncured elastomer is easily processible and, quite surprisingly, the elastomer even when compounded can be elongated substantially more than known chlorinated polyethylene elastomers without rupturing or breaking.

SUMMARY OF THE INVENTION

The present invention provides a novel uncured chlorinated polyethylene elastomer having:

(a) a molecular weight distribution of about 6–13, as determined by the ratio of $\overline{M}w/\overline{M}n$ where $\overline{M}w$ represents the weight average molecular weight and $\overline{M}n$ represents the number average molecular weight;

(b) a chlorine content of about 20–28%, preferably 22–26%, by weight; and (c) a Mooney viscosity value, determined according to ASTM D 1646-81, $ML_{(1+4)}$ at 100° C., of about 15–36, preferably 18–25, and (d) optionally, a sulfur content of about 0.2–2% by weight.

The uncured chlorinated polyolefin elastomers are prepared by mixing polyethylene with chlorine or a chlorine-generating material at elevated temperatures, said polyethylene having a flow rate of about 1–8 grams per 10 minutes as determined by ASTM D 1238 Condition E, and a molecular weight distribution of about 6–13 as determined by the ratio of $\overline{M}w/\overline{M}n$ where $\overline{M}w$ represents the weight average molecular and $\overline{M}n$ represents the number average molecular weight, and adding to the polyethylene an amount of chlorine or chlorine-generating material sufficient to incorporate into the polyethylene about 20–28%, preferably 22–26%, by weight chlorine.

DETAILED DESCRIPTION OF PREFERRED EMBODIMENTS

An important feature of this invention is the selection of the polyethylene that is used in the process. To obtain the desired results of a readily processible chlorinated polyolefin elastomer that is capable of hot elongation at temperatures just above the melting point of the elastomer one must use in the process a linear polyethylene, preferably having a density of about 0.94–0.97 g/cc, that has a flow rate of about 1–8, preferably 2–7, grams per 10 minutes as determined by ASTM D 1238 Condition E; secondly, the polyethylene must have a molecular weight distribution of about 6–13, preferably 6–9, as determined by the ratio of $\overline{M}w/\overline{M}n$ where $\overline{M}w$ represents the weight average molecular weight and $\overline{M}n$ represents the number average molecular weight of the polyethylene. Both the molecular weight determinations are made by gel permeation chromatography as described in, for example, Gel Chromatography by Kremmer and Boross, John Wiley Publishing Co. (1979). Although it is preferred to use linear polyethylene homopolymer in the process, optionally the polyethylene can contain an alpha-olefin comonomer in an amount of less than about 10% by weight, such as butene-1 and octene-1.

The polyethylene becomes elastomeric when chlorine atoms are incorporated into the polymer which lessens the degree of crystallinity of the polymer. The polyethylene can be chlorinated at elevated temperatures, usually about 60°–100° C., with gaseous chlorine or a chlorine-generating material. This process can be carried out in solution in an inert solvent, i.e., inert to the reactants, or in a suspension in an inert nonsolvent or without a solvent, all of which processes are known in the art and described, for example, in U.S. Pat. Nos. 3,759,888 and 3,347,835. These processes are usually conducted in the presence of conventional free-radical initiators, such as organic peroxides or aliphatic azo compounds. When the chlorination is conducted in an inert solvent, suitable solvents include chlorinated solvents, aromatic hydrocarbons and, specifically, carbon tetrachloride, tetrachloroethane, chloroform, chlorobenzene and trifluorochloroethane, or mixtures thereof. Suspension chlorination of the polyethylene is usually conducted in water. The amount of gaseous chlorine or chlorine-generating material that is used in the process must be sufficient to incorporate into the polyethylene about 20-28% by weight, preferably 22-26% by weight, chlorine. If less than about 20% by weight chlorine is incorporated into the polymer the crystallinity is undesirably high and if more than about 28% by weight chlorine is incorporated into the polymer the crystallinity is unacceptably low.

When polyethylene is chlorinated in the presence of sulfur dioxide and/or sulfuryl chloride, or if the reactions are conducted sequentially, sulfonyl chloride groups are introduced into the polymer. The sulfonyl chloride groups that are introduced into the elastomer do not significantly alter its physical properties, but allows the elastomer to be crosslinked or cured, usually with polybasic metal oxides, especially litharge (PbO), magnesium oxide, or polybasic metal salts of weak acids, such as tribasic lead maleate. The amount of sulfur in the form of sulfonyl chloride groups in the elastomer is from about 0.2-2% by weight, usually about 1% by weight.

The chlorinated polyethylene or chlorosulfonated polyethylene elastomers are characterized as having: a molecular weight distribution of about 6-13, as determined by the ratio of $\overline{M}w/\overline{M}n$ where $\overline{M}w$ represents the weight average molecular weight and $\overline{M}n$ represents the number average molecular weight, a chlorine content of about 20-28% by weight, a Mooney viscosity value, determined according to ASTM D 1646-81, $ML_{(1+4)}$ at 100° C. of 15-36. The percent elongation of the chlorosulfonated polyethylene compounded with nonreinforcing fillers, at 60° C., or at a temperature which is just above the melting point of the elastomer, and determined according to ASTM D 412, as illustrated in detail hereinbelow in examples, shows the extraordinarily high percent elongation obtained with the elastomers made using the conditions of the present process, as compared to chlorosulfonated polyethylenes known in the art. Similar results can be obtained with chlorinated polyethylene of the same chlorine level containing the same compounded ingredients, and tested just above its melting point e.g., about 70° C. The percent elongation of the elastomers were measured at 60° C. and determined according to ASTM D 412, at a draw rate of 50 cm. per minute when the chlorosulfonated polyethylenes were compounded with the ingredients listed below in the examples.

The high amount of elongation without rupturing or breaking a sheet of the uncured elastomer at a temperature just above its melting point is an important characteristic. The uncured chlorinated polyethylene elastomers which are usually compounded with fillers, acid acceptors, plasticizers, pigments, processing aids and the like can be fed to forming equipment and, for example, film can be conveyed and drawn down without rupturing or breaking the stock, which commonly occurs with elastomers made according to the teachings of the prior art. This permits one to conduct the forming process at higher rates. It also provides for the preparation of a wider range of films or sheet sizes, and it reduces the amount of manual labor required to prepare these formed products.

The chlorinated polyethylene elastomers described herein are especially useful in the uncured compounded condition as roofing film and pond and pit liners.

The following examples will serve to further illustrate the invention, parts and percentages are by weight unless otherwise indicated.

EXAMPLE 1

A stirred autoclave was charged with 18.16 kg of carbon tetrachloride and 1.35 kg of linear polyethylene having a density of 0.960 g/cc, a flow rate of 4.2 grams per 10 minutes and a molecular weight distribution ratio of $\overline{M}w/\overline{M}n$ of 11. The autoclave was closed and heated to 109° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml per minute throughout the remainder of the reaction. The temperature was reduced to 105° C. and a chlorine feed was begun and a total of 0.38 kg of chlorine was passed into the reaction over a period of 72 minutes. After 30 minutes from initiation of the reaction a feed of sulfuryl chloride was begun and 600 ml was added over a period of 20 minutes. After the addition of chlorine was complete, the pressure on the reactor was released and the sample was degassed at 100°-75° C. A stabilizer solution of 1% Epon 828 epoxy resin (condensation product of epichlorohydrin and bisphenol A with a neutralization equivalent of 180) in CCl₄ was added in an amount of 2.7 kg. The solution was filtered and the polymer was isolated by drum drying. The chlorosulfonated polyethylene product contained 23.6% Cl and 1.07% S, and the Mooney viscosity was 21. The $\overline{M}w/\overline{M}n$ ratio was unchanged at 11.

EXAMPLE 2

A stirred autoclave was charged with 18.16 kg of carbon tetrachloride and 1.36 kg of linear polyethylene having a density of 0.948 g/cc, a flow rate of 3.5 grams per 10 minutes and a molecular weight distribution ratio of $\overline{M}w/\overline{M}n$ of 9.5. The autoclave was closed and heated to 110° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml per minute throughout the remainder of the reaction. The temperature was reduced to 104° C. and a chlorine feed was begun. A total of 0.38 kg of chlorine was passed into the reaction over a period of 72 minutes. After 25 minutes from the beginning of the reaction a feed of sulfuryl chloride was begun and 600 ml was added over a period of 20 minutes. After the addition of chlorine was complete, the pressure on the reactor was released and sample was degassed at about 100°-75° C. A stabilizer solution of Epon 828 (1% in CCl₄ solvent) was added in an amount of 2.7 kg. The solution was filtered and the polymer was isolated by drum drying. The chlorosulfonated polyethylene product contained 23.5% Cl and 1.13% S, and the Mooney viscosity was 22.0. Mw/Mn ratio was unchanged at 9.5.

EXAMPLE 3

A stirred autoclave was charged with 18.16 kg of carbon tetrachloride and 1.36 kg of linear polyethylene having a density of 0.954 g/cc, a flow rate of 3.1 grams per 10 minutes and a molecular weight distribution ratio of $\overline{M}w/\overline{M}n$ of 9.9. The autoclave was closed and heated to 110° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml per minute throughout the remainder of the reaction. The temperature was reduced to 105° C. and a chlorine feed was begun. A total of 0.36 kg of chlorine was passed into the reaction over a period of 78 minutes. After 22 minutes from initiation of the reaction, a feed of sulfuryl chloride was begun and 600 ml was added over a period of 18 minutes. A feed of sulfur dioxide was begun after approximately 3 hours and 0.18 kg $SO_2$ was added over a period of 12 minutes. After the addition of chlorine and $SO_2$ was complete, the pressure on the reactor was released and sample was degassed at 85°–67° C. A stabilizer solution of Epon 828 (1% in $CCl_4$ solvent) was added in an amount of 2.7 kg. The solution was filtered and the polymer was isolated by drum drying. The chlorosulfonated polyethylene product contained 23.4% Cl and 0.97% S, and the Mooney viscosity was 22.5. Mw/Mn ratio was unchanged at 9.9.

HOT ELONGATION TEST DATA FOR EXAMPLES 1-3

The polymers of Example 1–3 and a control polymer (consisting of chlorosulfonated polyethylene having $ML_4$ (100° C.) of 37, Cl content of 23.5% and S content of 1.0% prepared from polyethylene of melt flow rate 2.8 and Mw/Mn of 5) were compounded and tested as follows. A sample of 68 g Maglite D (MgO), 595 g Ti-Pure (TiO$_2$), 1105 g Atomite Whiting (CaCO$_3$), 17 g 2,6-di-t-butyl-4-methylphenol, 25.5 g Carbowax S (polyethylene oxide glycol) and 10.2 g Kemamide S (stearamide) were mixed and added to a water-cooled 00 Banbury mixer followed by addition of a 1700 g sample of the polymer. This represents a ratio of polymer/MgO/TiO$_2$/CaCO$_3$/2,6-di-t-butyl-4-methylphenol/Carbowax S/Kemamide S of 100/4/35/65/1/1.5/0.6. The polymer stock was mixed until the temperature of the stock reached 100°–110° C. at which point the stock was removed and sheeted out on a rubber mill. A portion of the stock was rewarmed on the mill and then applied to the nip of a laboratory calender with 8 inch rolls. Calendared films measuring 0.03 in (7.6 mm) were prepared with the nip of the rolls set at 0.928 in (23.6 mm). The temperature of the calendering rolls was 250° F. (121° C.). Die C dumbbells were prepared for each of the polymers as described in ASTM D-412 and were died out in the machine direction of the calendered sheet. These dumbbells were tested for elongation at break at 60° C. at a draw rate of 50 cm/min as described in ASTM D 412. The results are shown in Table I.

TABLE I

| Sample | $E_B$ (%) at 60° C. |
|---|---|
| Control Polymer | 565 |
| Polymer of Example 1 | >1000 |
| Polymer of Example 2 | >1000 |
| Polymer of Example 3 | >1000 |

From the above data it can be seen that the uncured chlorosulfonated polyethylenes of the present invention can be formulated into compounded stocks having excellent hot extensibility.

EXAMPLE 4

A stirred autoclave was charged with 34.05 kg of carbon tetrachloride and 2.56 kg of linear polyethylene having a density of 0.950 g/cc, a flow rate of 1.1 grams per 10 minutes and a molecular weight distribution ratio of $\overline{M}w/\overline{M}n$ of 13. The autoclave was closed and heated to 110° C. and pressurized to about 25 psig (0.29 MPa) to dissolve the polyethylene. A feed of initiator solution (1%, 2,2'-azobis-[2-methylpropanenitrile] in chloroform) was begun and maintained at a rate of 3 ml per minute throughout the remainder of the reaction. The temperature was reduced to 105° C. and a chlorine feed was begun. A total of 0.89 kg of chlorine was passed into the reaction over a period of 115 minutes. After 29 minutes from initiation of reaction a feed of sulfuryl chloride was begun and 955 ml was added over a period of 26 minutes. After 3 hours and 15 minutes had elapsed from initiation of the reaction, a feed of sulfur dioxide was begun and 0.18 kg of $SO_2$ was added over a period of 24 minutes. After the addition of chlorine was complete the pressure on the reactor was released and the sample was degassed at 77°–100° C. A stabilizer solution of Epon 828 (1% in $CCL_4$ solvent) was added in an amount of 5.1 kg. The solution was filtered and the polymer was isolated by drum drying. The chlorosulfonated polyethylene product contained 23.2% Cl and 1.04% S, and the Mooney viscosity was 35.5 Mw/Mn ratio was unchanged at 13.

EXAMPLE 5

A stirred autoclave was charged with 36.6 kg of carbon tetrachloride and 2.72 kg of linear polyethylene having a density of 0.955 g/cc, a flow rate of 3.8 grams per 10 minutes and a molecular weight distribution ratio of $\overline{M}w/\overline{M}n$ of 9.9. The autoclave was closed and heated to 110° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml per minute throughout the remainder of the reaction. The temperature was reduced to 106° C., and a chlorine feed was begun. A total of 0.78 kg of chlorine was passed into the reaction over a period of 3.5 hours. After 34 minutes a feed of sulfuryl chloride was begun and 1200 ml was added over a period of 36 minutes. After approximately 3 hours and 20 minutes had elapsed from initiation of the reaction, a feed of sulfur dioxide was begun. A total of 0.104 kg of $SO_2$ was added over a period of 18 minutes. After the addition of chlorine was complete, the pressure on the reactor was released and sample was degassed at 86°–67° C. A stabilizer solution of Epon 828 (1% in $CCl_4$ solvent) was added in an amount of 5.4 kg. The solution was filtered and the polymer was isolated by drum drying. The chlorosulfonated polyethylene product contained 23.5% Cl and 0.93% S, and the Mooney viscosity was 21.5. The Mw/Mn ratio was unchanged.

HOT ELONGATION TEST DATA FOR EXAMPLES 4-5

The polymers of Examples 4–5 and a Control Polymer (consisting of chlorosulfonated polyethylene having $ML_4$ (100° C.) of 37, Cl content of 23.5% and S content of 1.0% prepared from polyethylene of melt flow rate 2.8 and Mw/Mn ratio of 5) were compounded, mixed, calendered and formed into test specimens as described hereinabove for the hot elongation tests of Examples 1–3, with the exception that 2,6-di-t-butyl-4-methylphenol was omitted from the formulation. The results are shown in Table II.

TABLE II

| Sample | $E_B$ (%) at 60° C. |
| --- | --- |
| Control Polymer | 900 |
| Polymer of Example 4 | >1030 |
| Polymer of Example 5 | >1083 |

As can be seen from the above data, uncured chlorosulfonated polyethylenes of the present invention can be formulated into compounded stocks having excellent hot extensibility.

EXAMPLE 6

A stirred autoclave was charged with 32.7 kg of carbon tetrachloride and 2.48 kg of linear polyethylene having a density of 0.956 g/cc, a flow rate of 5.6 grams per 10 minutes and a molecular weight distribution ratio of $\overline{M}w/\overline{M}n$ of 7.5. The autoclave was closed and heated to 110° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml/min. throughout the remainder of the reaction. A chlorine feed was begun and a total of 1.72 kg of chlorine was passed into the reaction over a period of approximately 4.25 hours. After the addition of chlorine was complete, the pressure on the reactor was released and sample was degassed at about 100°–75° C. A stabilizer solution of Epon 828 (1% in CCl₄ solvent) was added in an amount of 5.0 kg. The solution was filtered and the polymer was isolated by drum drying. The chlorinated polyethylene product contained 26.2% Cl and the Mooney viscosity was 20.5. The Mw/Mn ratio was unchanged at 7.5.

EXAMPLE 7

A stirred autoclave was charged with 18.16 kg of carbon tetrachloride and 1.36 kg of linear polyethylene having a density of 0.956 g/cc, a flow rate of 5.6 grams per 10 minutes and a molecular weight distribution ratio of $\overline{M}w/\overline{M}n$ of 7.5. The autoclave was closed and heated to 109° C. and pressurized to 25 psig (0.29 MPa) to dissolve the polyethylene. A feed of initiator solution (1% 2,2'-azobis-[2-methylpropanenitrile] in chloroform) was begun and maintained at a rate of 3 ml per minute throughout the remainder of the reaction. The temperature was reduced to 105° C. and a chlorine feed was begun. A total of 0.37 kg of chlorine was passed into the reaction over a period of 155 minutes. After 35 minutes from initiation of the reaction a feed of sulfuryl chloride was begun and 600 ml was added over a period of 15 minutes. After approximately 2.5 hours had elapsed from initiation of reaction, a feed of sulfur dioxide was begun. A total of 0.076 kg of SO₂ was added over a period of 8 minutes. After the addition of chlorine and SO₂ was complete the pressure on the reactor was released and the sample was degassed at about 100°–68° C. A stabilizer solution of Epon 828 (1% in CCl₄ solvent) was added in an amount of 2.7 kg. The solution was filtered and the polymer was isolated by drum drying. The chlorosulfonated polyethylene product contained 24.1% Cl and 1.16% S and the Mooney viscosity was 18.5.

I claim:

1. In a process for making an uncured chlorosulfonated polyolefin elastomer which comprises mixing polyethylene with chlorine or a chlorine-generating material in the presence of sulfur dioxide or sulfuryl chloride at elevated temperatures, the improvement which comprises said polyethylene having a flow rate of about 1–8 grams per 10 minutes as determined by ASTM D 1238 Condition E, and a molecular weight distribution of about 6–13 as determined by the ratio of $\overline{M}w/\overline{M}n$ where $\overline{M}w$ represents the weight average molecular weight and $\overline{M}n$ represents the number average molecular weight and adding to the polyethylene an amount of chlorine or chlorine-generating material sufficient to incorporate into the polyethylene about 20–28% by weight chlorine.

2. A process of claim 1 wherein the polyethylene has a flow rate of 2–7 grams per 10 minutes and adding to the polyethylene an amount of chlorine or a chlorine-generating material sufficient to incorporate into the polyethylene an amount of 22–26% by weight chlorine.

3. A process of claim 1 wherein the chlorosulfonation is carried out in an inert solvent.

4. An uncured chlorosulfonated polyethylene elastomer having:
   (a) a molecular weight distribution of about 6–13, as determined by the ratio of $\overline{M}w/\overline{M}n$ where $\overline{M}w$ represents the weight average molecular weight and $\overline{M}n$ represents the number average molecular weight;
   (b) a chlorine content of about 20–28% by weight;
   (c) a Mooney viscosity value, determined according to ASTM D 1646-81, $ML_{(1+4)}$ at 100° C., of about 15–36; and
   (d) a sulfur content of about 0.2–2 percent by weight.

5. An uncured chlorosulfonated polyethylene elastomer of claim 4 having a chlorine content of about 22–26% by weight.

6. An uncured chlorosulfonated polyethylene of claim 5 having a Mooney viscosity value, determined according to ASTM D 1646-81, $ML_{(1+4)}$ at 100° C., of about 18–25.

* * * * *